US012694840B2

(12) United States Patent
Kim et al.

(10) Patent No.: US 12,694,840 B2
(45) Date of Patent: Jul. 28, 2026

(54) ELECTRONIC DEVICE AND OPERATION METHOD THEREOF

(71) Applicant: SAMSUNG ELECTRONICS CO., LTD., Suwon-si (KR)

(72) Inventors: Hyunseok Kim, Suwon-si (KR); Junghyuk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/638,320

(22) Filed: Apr. 17, 2024

(65) Prior Publication Data

US 2025/0022427 A1 Jan. 16, 2025

Related U.S. Application Data

(63) Continuation of application No. PCT/KR2024/004285, filed on Apr. 3, 2024.

(30) Foreign Application Priority Data

Jul. 13, 2023 (KR) ........................ 10-2023-0090868

(51) Int. Cl.
*G09G 3/34* (2006.01)

(52) U.S. Cl.
CPC ... *G09G 3/3406* (2013.01); *G09G 2320/0626* (2013.01); *G09G 2330/021* (2013.01); *G09G 2340/0435* (2013.01)

(58) Field of Classification Search
CPC ........ G09G 5/003; G09G 5/395; G09G 5/006; G09G 5/18; G09G 3/2096; G09G 2330/06;

(Continued)

(56) References Cited

U.S. PATENT DOCUMENTS 6,839,048 B2 1/2005 Park
7,932,889 B2 4/2011 Park (Continued)

FOREIGN PATENT DOCUMENTS

KR 10-0415510 B1 1/2004
KR 10-2010-0071948 A 6/2010

(Continued)

OTHER PUBLICATIONS

Communication issued on Dec. 5, 2025 by the European Patent Office in European Patent Application No. 24839854.7.

(Continued)

*Primary Examiner* — Shaheda A Abdin
(74) *Attorney, Agent, or Firm* — Sughrue Mion, PLLC

(57) ABSTRACT

An electronic device may include: an image input, a display, memory storing instructions, and at least one processor operatively connected to the image input, the memory, and the display. At least one processor may be configured to execute the instructions to receive data regarding a first frame through the image input, generate first screen data regarding timing control and frame rate control of the first frame and store the first screen data in the memory, based on a difference between a first pixel value of the first frame and a pixel value of a frame contiguous to the first frame being equal to or less than a predetermined value, stop generating new screen data for controlling the display, and control the display to display a screen based on the first screen data.

20 Claims, 6 Drawing Sheets

(58) Field of Classification Search
CPC ........... G09G 2310/08; G09G 2360/18; G09G 3/3648; G09G 2330/021; G09G 2320/103
See application file for complete search history.

(56) References Cited

U.S. PATENT DOCUMENTS

| | | | | |
|---|---|---|---|---|
| 10,156,892 | B2 | 12/2018 | Lim et al. | |
| 2002/0130830 | A1* | 9/2002 | Park | G09G 3/3406 345/99 |
| 2010/0080459 | A1* | 4/2010 | Dai | G06T 5/40 382/170 |
| 2012/0081064 | A1* | 4/2012 | Leaver | H02P 23/26 318/721 |
| 2013/0241977 | A1 | 9/2013 | Okamoto et al. | |
| 2016/0012765 | A1 | 1/2016 | Jeong | |
| 2016/0203802 | A1 | 7/2016 | Hong et al. | |
| 2018/0224961 | A1 | 8/2018 | Yamamoto et al. | |
| 2019/0213953 | A1 | 7/2019 | Koh et al. | |
| 2020/0387211 | A1 | 12/2020 | Chang et al. | |

FOREIGN PATENT DOCUMENTS

| | | | |
|---|---|---|---|
| KR | 10-2015-0080103 | A | 7/2015 |
| KR | 10-2016-0008384 | A | 1/2016 |
| KR | 10 2017 0097469 | A | 8/2017 |
| KR | 10-2016-0087456 | A | 7/2018 |
| KR | 10-1890672 | B1 | 9/2018 |
| KR | 10-2019-0084191 | A | 7/2019 |
| KR | 10-2156770 | B1 | 9/2020 |
| KR | 10-2171313 | B1 | 10/2020 |
| KR | 10-2439419 | B1 | 9/2022 |
| KR | 10 2024 0106150 | A | 7/2024 |

OTHER PUBLICATIONS

International Search Report dated Jun. 25, 2024, issued by the International Searching Authority in International Application No. PCT/KR2024/004285.

Written Opinion dated Jun. 25, 2024, issued by the International Searching Authority in International Application No. PCT/KR2024/004285.

* cited by examiner

ELECTRONIC DEVICE AND OPERATION METHOD THEREOF

CROSS-REFERENCE TO RELATED APPLICATIONS

This application is a continuation application, claiming priority under § 365 (c), of an International application No. PCT/KR2024/004285, filed on Apr. 3, 2024, which is based on and claims from the benefit of a Korean patent application number 10-2023-0090868, filed on Jul. 13, 2023, in the Korean Intellectual Property Office, the disclosure of which is incorporated by reference herein in its entirety.

BACKGROUND

Field

Embodiments of the disclosure relate to an electronic device and a method for operating the electronic device. Specifically, embodiments of the disclosure relate to an electronic device and a method for operating the electronic device to save power consumption.

Description of Related Art

Display devices, such as TVs and monitors, may operate in power saving mode to reduce power consumption. The display device, in power saving mode, may reduce power by controlling the brightness of a display by adjusting a backlight unit (BLU) value and in some cases, by disabling certain features and/or functions of the display device. For example, upon failing to identify a user's input or a predetermined input signal (e.g., a signal received from a remote controller) for a certain period of time, the display device may execute power saving mode and turn off the screen and/or limit the communication functions over the network. As such, various technologies are being developed to prevent unnecessary power consumption of display devices.

SUMMARY

When a dynamic or moving images (e.g., video) and/or a movie or TV shows are displayed, the display device may adjust the BLU value and perform functions such as timing control and frame rate control (FRC) in order to display on a screen. However, when the display device determines that the user is not currently using the display device, such as the image displayed on the display device remains still for a certain period of time or no input, whether through a keyboard or a mouse, for a certain period of time resulting in no change in the screen displayed on a personal computer (PC) monitor, the display device may execute (or enter into) power saving mode to reduce unnecessary power consumption. However, since the user's non-use of the display device may be temporary, the display device may execute power saving mode after stepwise reductions in power, rather than immediately operating in power saving mode when there is no input for a predetermined time. The term "screen" may be interchangeably used with terms "display" or "monitor."

Based on the above, the disclosure provides a method and device for saving power consumption when the user does not use the display device.

According to an example embodiment, an electronic device may include an image input unit; a display, memory storing instructions, and at least one processor operatively connected to the image input unit, the memory, and the display. At least one processor may be configured to execute the instructions to receive data regarding a first frame through the image input unit, generate first screen data regarding timing control and frame rate control of the first frame and store the first screen data in the memory, based on a difference between a first pixel value of the first frame and a pixel value of a frame contiguous to the first frame being equal to or less than a predetermined value, stop generating new screen data for controlling the display, and control the display to display a screen based on the first screen data.

At least one processor may be further configured to execute the instructions to control the display to display the screen based on the first screen data, based on identifying that a second frame having a second pixel value different from the first pixel value by a first value or more is not received for a predetermined time after the first frame.

At least one processor may be further configured to execute the instructions to control the display to reduce a value of a backlight unit of the display to a predetermined level or less based on controlling the display to display the screen based on the first screen data.

At least one processor may be further configured to execute the instructions to control the display to deactivate the backlight unit based on identifying that the second frame is not received for a second time or more.

At least one processor may be further configured execute the instructions to generate second screen data regarding timing control and frame rate control of the second frame, based on receiving the second frame, and control the display to display the second frame based on the second screen data.

At least one processor may be further configured execute the instructions to: identify histogram information of the first frame; and identify the first pixel value based on the histogram information.

The first pixel value may be a red-green-blue (RGB) value.

At least one processor may be further configured to execute the instructions to resume generation of the screen data for controlling the display based on receiving the second frame.

According to an example embodiment, a method for operating an electronic device, may include: receiving data regarding a first frame; generating first screen data regarding timing control and frame rate control of the first frame and storing the first screen data in memory; based on a difference between a first pixel value of the first frame and a pixel value of a frame contiguous to the first frame being equal to or less than a predetermined value, stopping generating new screen data for controlling a display; and displaying a screen based on the first screen data on the display.

The method further may include displaying the screen based on the first screen data based on identifying that a second frame having a second pixel value different from the first pixel value by a first value or more is not received for a predetermined time after the first frame.

The method further may include reducing a value of a backlight unit of the display to a predetermined level or less based on displaying the screen based on the first screen data.

The method further may include deactivating the backlight unit based on identifying that the second frame is not received for a second time or more.

The method further may include generating second screen data regarding timing control and frame rate control of the second frame, based on receiving the second frame; and displaying the second frame on the display based on the second screen data.

The method further may include identifying histogram information of the first frame and identifying the first pixel value based on the histogram information.

The pixel value may be a red-green-blue (RGB) value.

The method further may include resuming generation of the screen data for controlling the display based on receiving the second frame.

According to an example embodiment, a method for operating an electronic device, may include: receiving an input signal from an external device; monitoring histogram information of the input signal; identifying that there is no change in the input signal for a predetermined time based on the histogram information; stopping timing and frame rate control for the input signal based on identifying that there is no change in the input signal for the predetermined time; displaying a screen based on it being identified that there is no change in the input signal; and resuming the timing and frame rate control for the input signal based on identifying a change in the input signal.

The method further may include determining that there is no change in the input signal based on a change in a pixel value of a frame constituting video data in the input signal being equal to or less than a predetermined value.

The method further may include reducing a backlight unit value to a predetermined level or less based on identifying that there is no change in the input signal for the predetermined time.

The method further may include setting the backlight unit value to the predetermined value or more based on identifying a change in the input signal.

Embodiment of the disclosure may save power consumption of the display device not used by the user.

Embodiment of the disclosure may save unnecessary power consumption of the display device.

Effects of the disclosure are not limited to the foregoing, and other unmentioned effects would be apparent to one of ordinary skill in the art from the following description.

BRIEF DESCRIPTION OF THE DRAWINGS

The above and other aspects, features, and advantages of certain embodiments of the disclosure will be more apparent from the following description taken in conjunction with the accompanying drawings, in which.

The same or similar reference denotations may be used to refer to the same or similar elements throughout the specification and the drawings.

DETAILED DESCRIPTION

Figure 1:
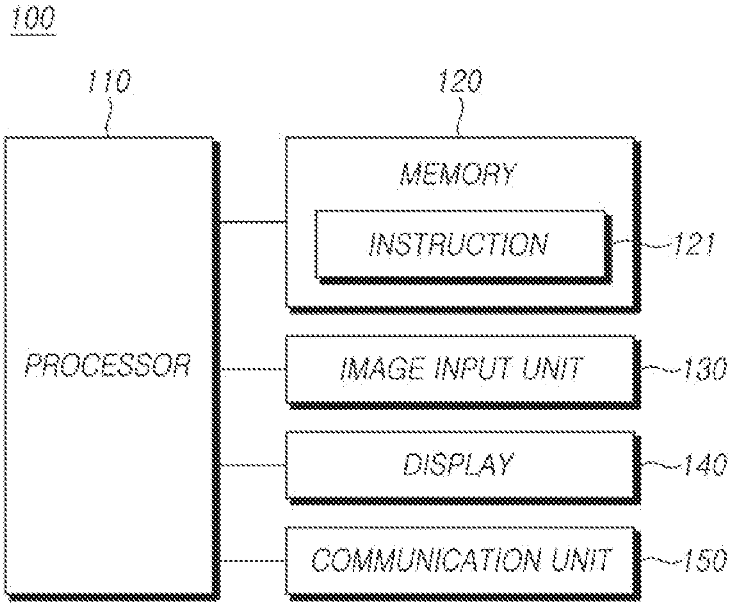
FIG. 1 is a block diagram illustrating a configuration of an electronic device according to an embodiment.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

Elements described as "module," "unit," or "part" may be physically implemented by analog and/or digital circuits including one or more of a logic gate, an integrated circuit, a microprocessor, a microcontroller, a memory circuit, a passive electronic component, an active electronic component, and the like.

FIG. 1 is a block diagram illustrating a configuration of an electronic device according to an embodiment. The electronic device 100 may be a wearable terminal or device, such as a watch or glasses, capable of performing various computing functions, such as displaying video and communicating with another terminal. The electronic device 100 may be various types of terminals and not limited to the above examples.

According to an embodiment, the memory 120 is a storage medium used by the electronic device 100 and may store data, such as at least one command 121 corresponding to at least one program or configuration information. The program may include an operating system (OS) program and various application programs.

In an embodiment, the memory 120 may store pairing information of an external electronic device paired (or connected) to the electronic device 100. In an embodiment, the pairing information may include, e.g., device information about the external electronic device, information about another external electronic device or remote control device paired with the external electronic device, information about a scheme (e.g., Bluetooth or Wi-Fi) in which the external electronic device and the other external electronic device or remote control device are paired with each other, or information about a pairing history between the external electronic device and the other external electronic device or remote control device.

In an embodiment, the storage unit 120 may include at least one of flash memory type, hard disk type, multimedia card micro type, card type memory (e.g., SD or XD memory cards), random access memories (RAMs), static random access memories (SRAMs), read-only memories (ROMs), electrically erasable programmable read-only memories (EEPROMs), programmable read-only memories (PROMs), magnetic memories, magnetic disks, or optical discs.

According to an embodiment, the image input unit 130 may receive images and/or image information through a tuner (not shown), an input/output unit (not shown), or the communication unit 150. The image input unit 130 may include at least one of the tuner or the input/output unit. The tuner may tune (or adjust) and select only the frequency of the broadcast channel configured to be received by the electronic device 100 among many radio components, by amplifying, mixing, and resonating the broadcast signals wiredly/wirelessly received. The broadcast signal may include video, audio, and additional data (e.g., electronic program guide (EPG)). The tuner may receive real-time broadcast channels (or real-time viewing images) from various broadcast sources, such as terrestrial broadcasts, cable broadcasts, satellite broadcasts, Internet broadcasts, and the like. The tuner may be implemented integrally with the electronic device 100 or may be implemented as a separate tuner electrically connected to the electronic device 100. The input/output unit may include at least one of a high-definition multimedia interface (HDMI) input port, a component input jack, a PC input port, or a USB input jack capable of receiving an image and image information from an external device of the electronic device 100 under the control of the (at least one) processor 110. The input/output unit may be added, deleted, and/or changed according to the performance and structure of the electronic device 100.

According to an embodiment, the display 140 may perform functions related to outputting information in the form of numbers, characters, images, and/or graphics. The display 140 may include at least one hardware module for output. The at least one hardware module may include at least one of, e.g., a liquid crystal display (LCD), a light emitting diode (LED), a light emitting polymer display (LPD), an organic light emitting diode (OLED), an active-matrix organic light emitting diode (AMOLED), or flexible LED (FLED). The display 140 may display a screen corresponding to data received from the processor 110. The display 140 may be referred to as an 'output unit,' a 'display unit,' or by other terms having an equivalent technical meaning.

According to an embodiment, the communication unit 150 may provide a wired/wireless communication interface enabling communication with an external device. The communication unit 150 may include at least one of a wired Ethernet, a wireless LAN communication unit, or a short-range communication unit. The wireless LAN communication unit may include, e.g., Wi-Fi, and may support the wireless LAN standard (IEEE802.11x) of the institute of electrical and electronics engineers (IEEE). The wireless LAN communication unit may be wirelessly connected to an access point (AP) under the control of the processor 110. The short-range communication unit may perform short-range communication wirelessly with an external device under the control of the processor 110. Short-range communication may include Bluetooth, Bluetooth low energy, infrared data association (IrDA), ultra-wideband (UWB), and near-field communication (NFC). The external device may include a server device and a mobile terminal (e.g., phone, tablet, etc.) providing, e.g., a video service.

According to an embodiment, the processor 110 may control at least one other component of the electronic device 100 and/or execute computation or data processing regarding communication by executing at least one command 121 stored in the memory 120. The processor 110 may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

In an embodiment, the processor 110 may execute, e.g., a software to control at least one other component (e.g., a hardware or software component) of the electronic device 100 connected with the processor 110 and may process or compute various data. According to an embodiment, as at least part of the data processing or computation, the processor 110 may store a command or data received from another component onto a volatile memory, process the command or the data stored in the volatile memory, and store resulting data in a non-volatile memory. According to an embodiment, the processor 110 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 100 includes the main processor and the auxiliary processor, the auxiliary processor may be configured to use lower power than the main processor or to be used for a specific function. The auxiliary processor may operate separately or as part of the main processor.

In an embodiment, the processor may obtain image frame data from at least one of the memory 120, the image input unit 130, or the communication unit 150. The image frame data may be or relate to data regarding a frame constituting an image. For example, the image frame data may be stored in the memory 120 (e.g., a stored recorded image). For example, the image frame data may be obtained from the communication unit 150 or the image input unit 130 (e.g., real-time streaming image).

Figure 2:
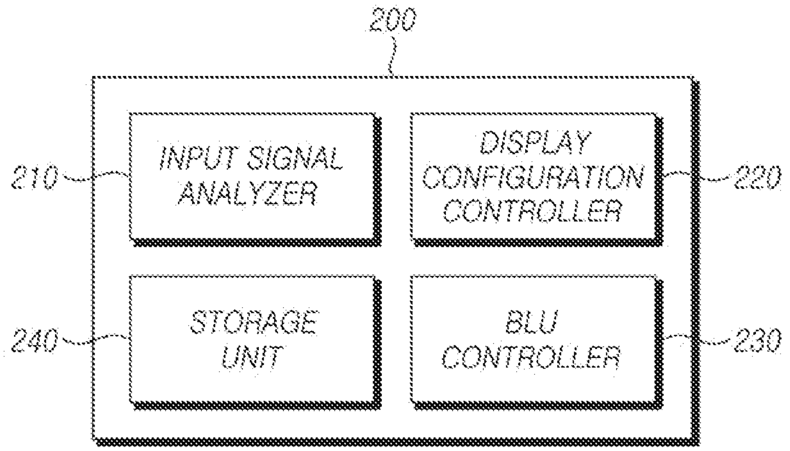
FIG. 2 is a block diagram illustrating a detailed configuration of an electronic device according to an embodiment.

FIG. 2 is a block diagram illustrating a detailed configuration of an electronic device according to an embodiment. The electronic device 200 may refer to a device corresponding to the electronic device 100 of FIG. 1. In the description of FIG. 2, descriptions overlapping those described with reference to FIG. 1 may be omitted. The block diagram of FIG. 2 illustrates only what is necessary for the description of the disclosure, and therefore, any description of the disclosure that may be considered apparent to one of ordinary skill in the art may be added or omitted.

Referring to FIG. 2, the electronic device 200 according to an embodiment may include an input signal analyzer 210, a display configuration controller 220, a backlight unit (BLU) controller 230, and a storage unit (memory) 240.

According to an embodiment, the input signal analyzer 210 may analyze an input signal received from an external device. The electronic device may be connected e.g., via HDMI to the external device (e.g., a PC or a set-top box). The electronic device may receive the input signal from the external device through an image input unit (e.g., the image input unit 130).

In an embodiment, the input signal is a signal received from the external device, and may include image information used by the user (e.g., information related to a PC screen if the external device is a PC and data related to an image received from a set-top box if the external device is the set-top box). For example, the input signal may be a transition minimized differential signaling (TMDS) signal. The input signal may include a plurality of data channels, and different types of data (e.g., color data of red (R), green (G), and blue (B)) may be transferred to the electronic device through the respective channels.

In an embodiment, the input signal analyzer 210 may analyze the input signal to determine whether the image to be displayed on the screen is a still image. For example, the input signal analyzer 210 may determine whether the image to be displayed on the screen is a still image based on the pixel value of the frame of the video data. When the input signal analyzer 210 identifies that at least a predetermined number of frames are the same or have a difference of a specified level or less, the input signal analyzer 210 may determine that the image to be displayed by the input signal is a still image. For example, the input signal analyzer may determine whether the image to be displayed on the screen is a still image based on the histogram information about the video data. After identifying the histogram information from the input signal, the electronic device may sample and analyze the histogram information to determine whether the image is a still image.

In an embodiment, the input signal analyzer 210 may compare pixel values between adjacent frames included in the video data, or when the extracted motion vector is less than or equal to a threshold, the input signal analyzer 210 may determine that the image to be displayed by the video data is a still image.

In an embodiment, the input signal analyzer 210 may detect a pixel value change in the entire or partial area of the screen and may determine that the image to be displayed by the video data is a still image. The input signal analyzer 210 may calculate a difference in pixel value between the previous frame and the current frame, and when the difference is less than or equal to a threshold, the input signal analyzer 210 may determine that the image to be displayed on the screen is a still image. In this case, the electronic device may determine that the image to be displayed on the screen is a still image when a predetermined number or more of consecutive frames have the same pixel value or frames having the same pixel value are identified for a predetermined time, rather than determining that the image is a still image simply because the pixel values of the two consecutive frames are the same.

The still image may be of various formats including photos, Microsoft (MS) power point, or MS word.

In an embodiment, the input signal analyzer 210 may determine whether the image is a still image by analyzing a time difference between adjacent frames. If the time difference between frames is larger than or equal to a predetermined time, the image may be determined as a still image.

In an embodiment, the input signal analyzer 210 may determine whether the image to be displayed on the screen is a still image by analyzing the overall brightness of the screen. For example, when the change in the brightness of the entire screen is equal to or less than a threshold, the electronic device may determine that the image to be displayed on the screen is a still image. The input signal analyzer 210 may determine whether an image is a still image by using any one of the above-described embodiments or by combining the above-described embodiments. When it is determined that at least a predetermined number of frames are the same, or when it is determined that frames identified for a predetermined time are the same, the input signal analyzer 210 may determine that the image displayed on the screen is a still image.

In an embodiment, the display configuration controller 220 may output an output signal (e.g., ultra serial interface technology (USIT)) to the display panel based on the video data received from the external device, and the electronic device may display a screen based on the output signal. For example, the display configuration controller 220 may generate an output signal by controlling the timing of the input signal, and the electronic device 200 may display a screen based thereon. For example, the display configuration controller 220 may adjust the frame rate of the input signal to generate an output signal, and the electronic device 200 may display a screen based thereon. In other words, the display configuration controller 220 may perform timing control and frame rate control on the input signal and then generate an output signal based on the controlled timing and frame rate, and the generated output signal may be transferred to the display panel of the electronic device 200 to display a screen.

The electronic device may receive Vx1, which is a video data signal transmitted from an external device. Vx1 may include data regarding the image to be displayed on the display. The received Vx1 may be transferred to a timing controller (TCON) of the display configuration controller 220. The TCON may be a component for controlling the timing of the display panel, and the display configuration controller 220 may adjust the timing of the input signal according to the display panel through the TCON. The frame rate controller of the display configuration controller 220 may process the Vx1 signal received from the TCON. The frame rate controller may smoothly express the image by adjusting the frame speed or may perform an operation for matching the frame speed of the display panel with the input signal. Thereafter, the video data processed by the TCON or the FRC may be converted into a USIT output signal and transferred to the display panel. Based on the USIT output signal, data regarding the image included in the video data may be displayed on the screen.

In an embodiment, the BLU controller 230 may control a BLU of the electronic device. The BLU controller 230 may control the BLU to adjust the brightness of the display (e.g., the display 140) of the electronic device 200. The BLU controller 230 may receive a signal for BLU control through a serial peripheral interface (SPI) system. The BLU controller 230 may receive the BLU control signal transmitted from the processor (e.g., the processor 110) or the input signal analyzer 210, and based on the received BLU control signal, the BLU controller 230 may perform an operation related to the backlight brightness adjustment, power ON or OFF, and backlight power management. The BLU controller 230 may then generate a mini low voltage differential signaling (mLVDS) output signal and transfer it to the backlight unit, and accordingly, the brightness of the display may be adjusted.

In an embodiment, the storage unit (memory) 240 may store timing control information and frame rate control information generated by the display configuration controller 220. The storage unit (memory) 240 may store BLU control information generated by the BLU controller.

The operations of the input signal analyzer 210, the display configuration controller 220, and the BLU controller 230 may be operations continuously performed while the input signal is received to display video data included in the input signal. However, in some cases, when there is no change in the input signal (e.g., if a same display or image is displayed for a predetermined time because nothing is being played and the user's manipulation is not identified), it may be preferable in terms of power saving not to continuously analyze the input signal, control the display configuration, and control the BLU.

Figure 3:
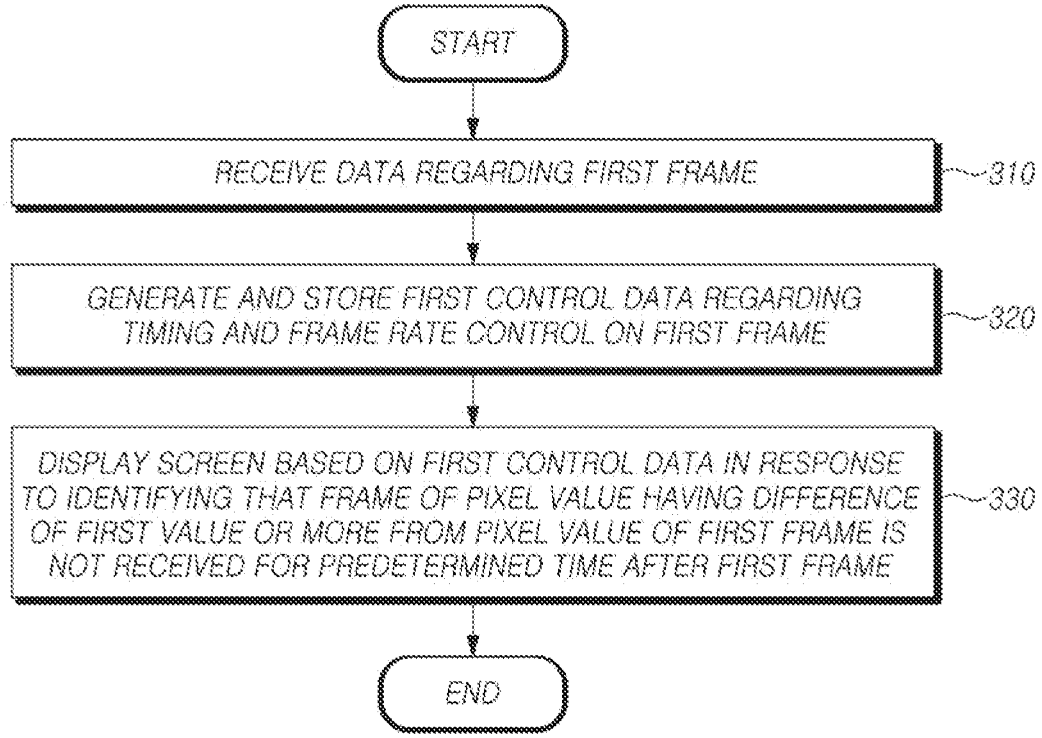
FIG. 3 illustrates an operation flow of an electronic device according to an embodiment.
Figure 4:
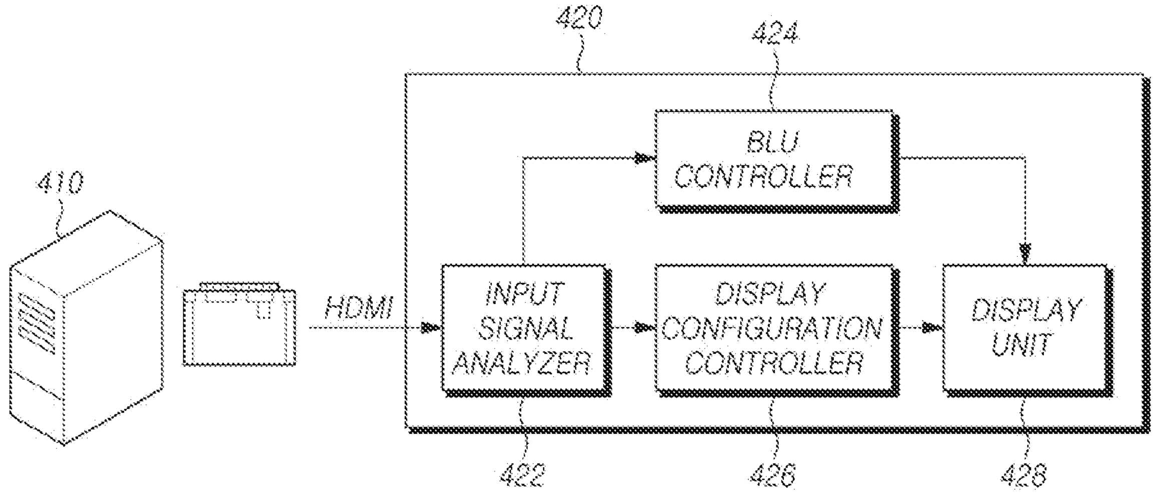
FIG. 4 illustrates an example operation of an electronic device according to an embodiment.

FIG. 3 illustrates an operation flow of an electronic device according to an embodiment. FIG. 4 illustrates an example of controlling a screen in an electronic device according to an embodiment. The electronic device of FIG. 3 and the electronic device 420 of FIG. 4 may be devices corresponding to the electronic device 100 of FIG. 1 and the electronic device 200 of FIG. 2. The input signal analyzer 422 of FIG. 4 may be a component corresponding to the input signal analyzer 210 of FIG. 2. The display configuration controller 426 of FIG. 4 may be a component corresponding to the display configuration controller 220 of FIG. 2. The BLU controller 424 of FIG. 4 may be a component corresponding to the BLU controller 230 of FIG. 2. The display unit 428 of FIG. 4 may be a component corresponding to the display 140 of FIG. 1. In the description of FIGS. 3 and 4, descriptions overlapping those described with reference to FIGS. 1 and 2 may be omitted.

According to an embodiment, in operation 310, the electronic device may receive data regarding a first frame.

In an embodiment, the electronic device may receive an input signal, including video data, from an external device (e.g., a PC or a set-top box). The video data may include data regarding one or more frames. The first frame may indicate or show any one of one or more frames included in the video data of the input signal. For example, the electronic device 420 may be connected to the external device 410 via HDMI. The electronic device 420 may receive an input signal from the external device 410 via HDMI.

According to an embodiment, in operation 320, the electronic device may generate and store first screen data regarding timing control and frame rate control of the first frame.

In an embodiment, in response to receiving the video data, the electronic device may perform timing control and frame rate control on the frame included in the video data in order to display the video data on the display. The operation in which the electronic device performs timing control on the first frame may correspond to the operation of the TCON of the display configuration controller of FIG. 2. The operation in which the electronic device performs frame rate control on the first frame may correspond to the operation of the frame rate controller of the display configuration controller of FIG. 2. The electronic device may execute timing control and frame rate control on the first frame and generate first screen data that includes information related to the executed first frame. The generated first screen data may be stored in a non-volatile memory (e.g., the memory 240) inside a processor (e.g., a CPU). For example, the input signal analysis unit (e.g., input signal analyzer 422) may analyze the frame included in the video data and transfer the analyzed frame to the display configuration controller 426. The display configuration controller 426 may generate first screen data including information about timing control and frame rate control of the frame included in the video data received from the input signal analyzer 422, and may transmit an output signal (e.g., USIT) including the same to the display (e.g., display unit 428). For example, the input signal analyzer 422 may analyze the frame included in the video data and transmit the frame to the BLU controller 424. The BLU controller 424 may generate screen data including BLU control information for controlling the backlight unit according to the video data received from the input signal analyzer 422, and may transmit an output signal (e.g., mLVDS) including the screen data to the display (e.g., display unit 428). The display unit 428 may display the first frame based on the output signal received from the BLU controller 424 and the display configuration controller 426.

In an embodiment, although not shown, the first screen data of the first frame may be stored in the memory.

In an embodiment, in operation 330, the electronic device may display the screen using the first screen data in response to identifying that a frame having a pixel value different from the pixel value of the first frame by a first value or more is not received for a predetermined time after the first frame. When the electronic device determines that the image displayed on the screen, based on the video data, is a still image, it is advantageous in terms of power saving to display the screen based on the already-generated first screen data rather than to perform frame rate control and timing control again for each frame. Therefore, when the electronic device receives an input signal, the electronic device may cease operations, such as frame rate control and timing control, performed and may display the screen using the previously-generated first screen data. For example, when the input signal analyzer 422 determines that the image is a still image, the display unit 428 may be controlled based on the first screen data and the BLU control information about the first frame stored in the memory without transferring data to the BLU controller 424 and the display configuration controller 426. In other words, the display configuration controller 426 and the BLU controller 424 may be temporarily turned off.

In an embodiment, the video data, included in the input signal received from the external device, may include a first frame and at least one frame contiguous to the first frame. When only the same frames as the first frame are identified for a predetermined time, the electronic device may determine that the displayed image is a still image.

In an embodiment, the electronic device may compare the pixel value of the first frame with the pixel value of another frame contiguous to the first frame. When the pixel value of the first frame and the pixel value of another frame contiguous to the first frame are less than or equal to a predetermined value, it may be determined that the first frame and the other frame are the same.

In an embodiment, when only frames having a pixel value that does not differ from the pixel value of the first frame by a predetermined value or more are identified while a predetermined time elapses, the electronic device may determine that the corresponding image is a still image.

In an embodiment, the pixel value may be an RGB value of the pixel included in the frame.

In an embodiment, the electronic device may identify histogram information about the first frame and may determine whether the image to be displayed on the screen of the frame is a still image, based on the histogram information.

In an embodiment, when the electronic device determines that the image to be displayed according to the video data is a still image, the electronic device may stop timing control and frame rate control on the frame included in the video data, i.e., stop the operations of the TCON and the frame rate controller, and display a display screen based on the first screen data generated for the first frame and stored in the memory (e.g., the memory 240), thereby reducing power consumption.

In an embodiment, when the electronic device determines that the image to be displayed according to the video data is a still image, the electronic device may control the BLU to reduce the brightness of the display to a predetermined level or less. When the image is a still image, it is highly likely that the user is not using the electronic device. Therefore, the electronic device may reduce power consumption by reducing brightness of the display. The electronic device may gradually reduce the brightness, and when only the same frames as the first frame are continuously identified while the threshold time elapses after the first frame, the electronic device may set the brightness of the screen to 0.

In an embodiment, the electronic device may display the screen based on the first screen data and, when identifying a frame having a pixel value different from the pixel value of the first frame by the first value or more, i.e., a frame not identical to the first frame, resume frame rate control and timing control on the video data included in the input signal to generate an output signal (e.g., USIT) and accordingly display the same. In an embodiment, the electronic device may generate second screen data regarding timing control and frame rate control of the second frame in response to receiving the second frame having a difference of the first value or more and display the second frame through the display based on the second screen data.

Figure 5:
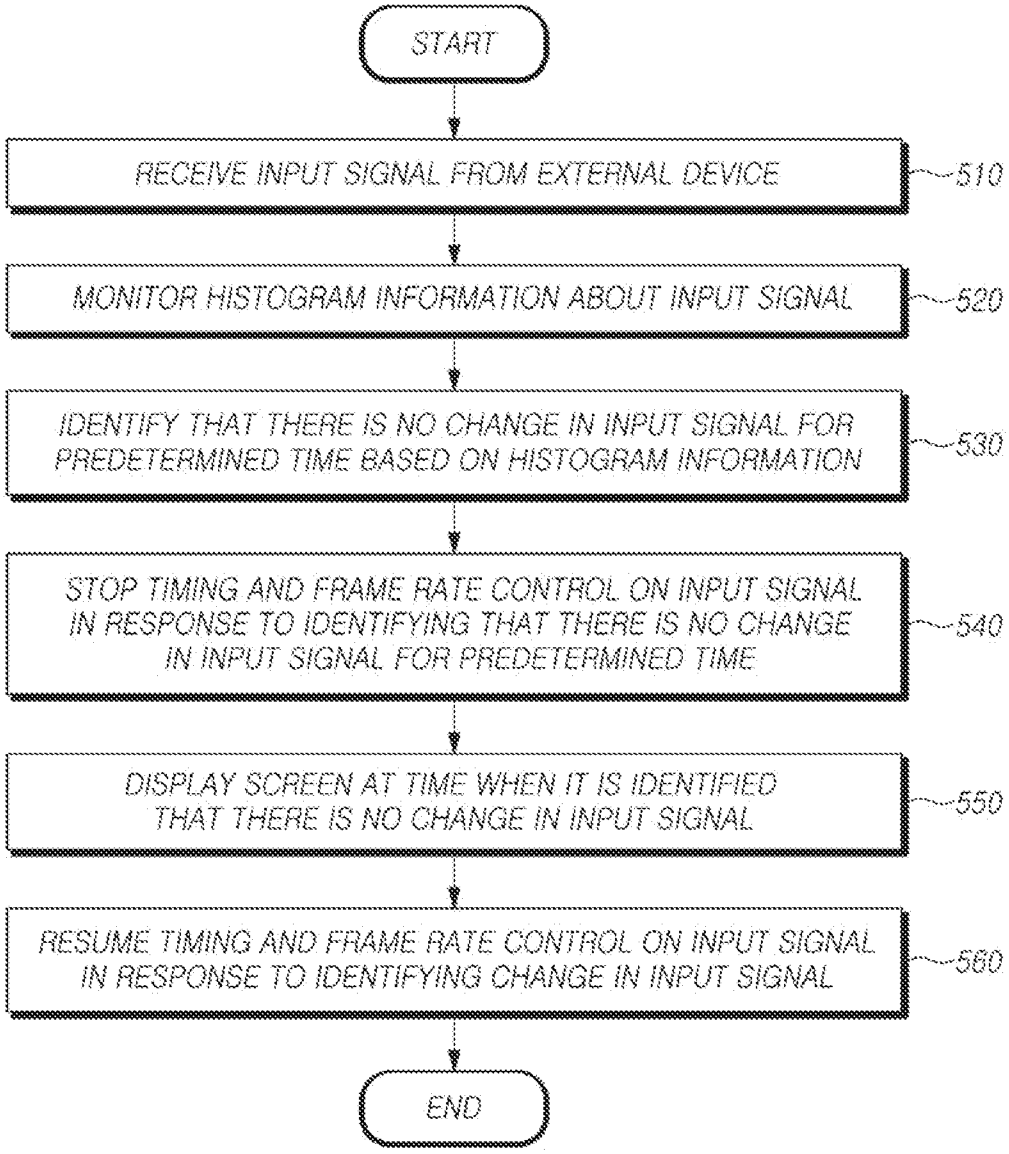
FIG. 5 illustrates an operation flow of an electronic device according to an embodiment.

FIG. 5 illustrates an operation flow of an electronic device according to an embodiment. The electronic device of FIG. 5 may be a device corresponding to the electronic device 100 of FIG. 1 and the electronic device 200 of FIG. 2.

According to an embodiment, in operation 510, the electronic device may receive an input signal from an external device. For example, the electronic device 420 may receive an input signal from the external device 410 via HDMI. Operation 510 may indicate an operation corresponding to operation 310 of FIG. 3.

According to an embodiment, in operation 520, the electronic device may monitor histogram information of the input signal. To collect histogram information from the input signal (e.g., a TMDS signal) input through the external device, the electronic device may sample the input signal and generate histogram data from each sample. The electronic device may monitor a change in brightness of the display by analyzing the same.

The electronic device may monitor pixel values of frames included in the input signal as well as histogram information of the input signal. Such operation may include all the operations according to operation 330 of FIG. 3.

According to an embodiment, in operation 530, the electronic device may identify that there is no change in the input signal for a predetermined time based on the histogram information.

In an embodiment, when the change in the input signal is less than or equal to a threshold, the electronic device may determine that there is no change in the input signal. Operation 530 of FIG. 5 may be an operation corresponding to the operation of identifying that a frame of a pixel value having a difference of the first value or more from the pixel value of the first frame for a predetermined time is not received in operation 330 of FIG. 3.

According to an embodiment, in operation 540, the electronic device may stop timing and frame rate control for the input signal in response to identifying that there is no change in the input signal for the predetermined time.

In an embodiment, when it is identified that there is no change in the input signal for a predetermined time, the electronic device may determine that the image displayed on the screen is a still image.

According to an embodiment, in operation 550, the electronic device may display a screen at the time when it is identified that there is no change in the input signal. The electronic device may display a screen displayed at the time when it is determined that the image is a still image, i.e., a still screen. When it is determined that the image displayed on the screen is a still image, the electronic device may display the still screen as it is without the need for performing timing control and frame rate control on the input signal to display the same screen as the screen displayed at the previous time.

According to an embodiment, in operation 560, the electronic device may resume the timing and frame rate control on the input signal in response to identifying a change in the input signal.

In an embodiment, when identifying a change in the input signal, the electronic device may determine that the image displayed on the screen is no longer a still image, and accordingly, may perform timing control and frame rate control on the input signal again.

Figure 6:
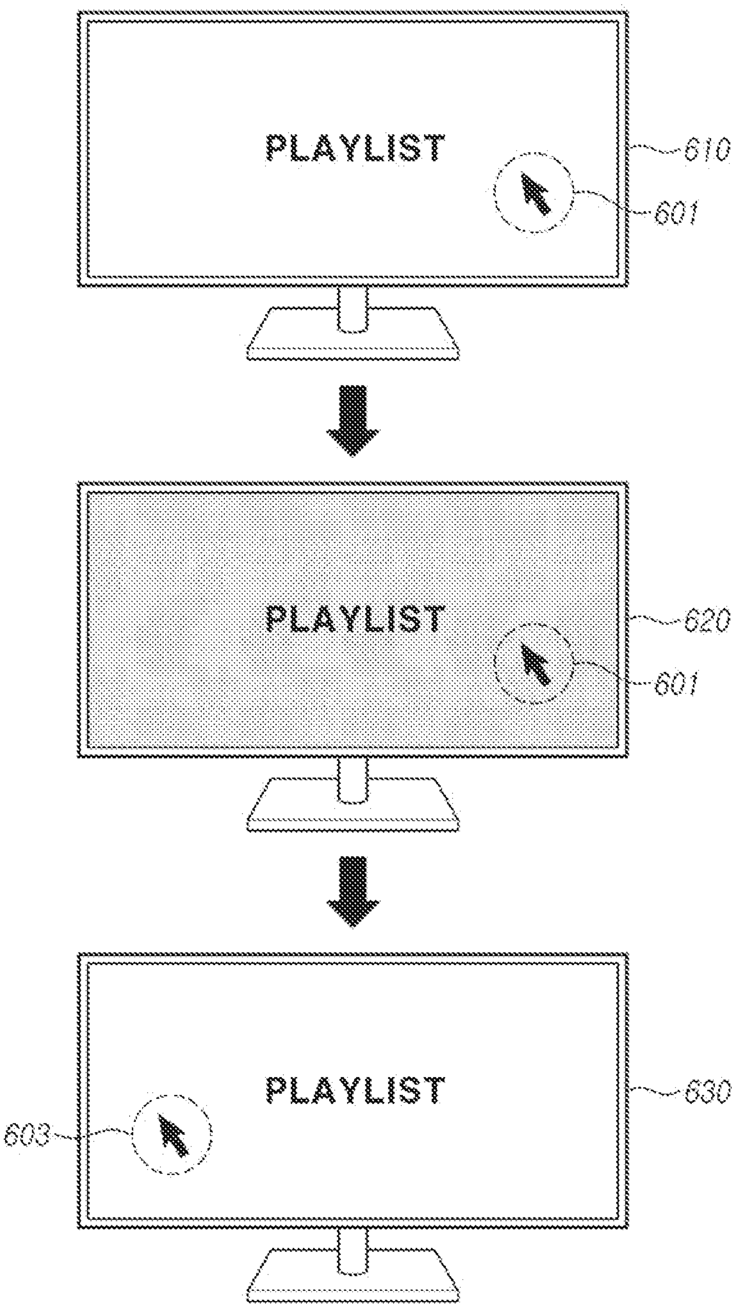
FIG. 6 illustrates an example screen displayed on an electronic device according to an embodiment.

FIG. 6 illustrates an example screen displayed on an electronic device according to an embodiment. FIG. 6 illustrates a change in a screen displayed according to the operations of the electronic device described with reference to FIG. 3 or FIG. 5.

Referring to FIG. 6, the electronic device may display a first screen 610. The first screen 610 may include an image being played (e.g., a screen related to music playback) and a mouse cursor.

In an embodiment, the second screen 620 is an example of a screen displayed after a predetermined time elapses without changing an input signal after the electronic device displays the first screen. If only the same frame as the frame displayed on the first screen 610 is identified for a predetermined time, i.e., if there is no change in the input signal, the electronic device may stop the frame rate control and timing control on the input signal. Further, the electronic device may reduce the BLU value of the second screen 620 to a predetermined level or less, thereby reducing power consumption.

In an embodiment, the third screen 630 is an example of a screen displayed when a change in the input signal is identified while the second screen 620 is displayed. Referring to FIG. 6, it may be identified that the mouse cursor has moved from the first position 601 to the second position 603. Since a change in the pixel value of the frame or a change in input signal is identified according to the user's manipulation, the electronic device may resume frame rate control and timing control and increase the BLU value to the predetermined level or more.

The electronic device according to various embodiments of the disclosure may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the server device described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While certain embodiments of the disclosure have been particularly shown and described, it will be understood that various changes in form and details may be made therein without departing from the spirit and scope of the following claims.

What is claimed is:

1. An electronic device, comprising:

an image input unit;

a display;

memory storing instructions; and at least one processor operatively connected to the image input unit, the memory, and the display, wherein the at least one processor is configured to execute the instructions to:

receive data regarding a first frame through the image input unit;

generate first screen data regarding timing control and frame rate control of the first frame and store the first screen data in the memory;

based on a difference between a first pixel value of the first frame and respective pixel value of a number of frames contiguous to the first frame for a predetermined time being equal to or less than a predetermined value, stop generating new screen data regarding timing control and frame rate control of the number of frames contiguous to the first frame for controlling the display; and control the display to display the first frame based on the first screen data.

2. The electronic device of claim 1, wherein the at least one processor is further configured to execute the instructions to control the display to display the first frame based on the first screen data, based on identifying that a second frame having a second pixel value different from the first pixel value by a first value or more is not received for a duration greater than the predetermined time.

3. The electronic device of claim 2, wherein the at least one processor is further configured to execute the instructions to control the display to reduce a value of a backlight unit (BLU) of the display to a predetermined level or less based on controlling the display to display the first frame based on the first screen data.

4. The electronic device of claim 3, wherein the at least one processor is further configured to execute the instructions to control the display to deactivate the BLU based on identifying that the second frame is not received for a second time or more.

5. The electronic device of claim 4, wherein the at least one processor is further configured execute the instructions to:

generate second screen data regarding timing control and frame rate control of the second frame, based on receiving the second frame; and control the display to display the second frame based on the second screen data.

6. The electronic device of claim 5, wherein the at least one processor is further configured execute the instructions to:

identify histogram information of the first frame; and identify the first pixel value based on the histogram information.

7. The electronic device of claim 6, wherein the first pixel value is a red-green-blue (RGB) value.

8. The electronic device of claim 7, wherein the at least one processor is further configured to execute the instructions to resume generation of the screen data for controlling the display based on receiving the second frame.

9. A method for operating an electronic device, the method comprising:

receiving data regarding a first frame;

generating first screen data regarding timing control and frame rate control of the first frame and storing the first screen data in memory;

based on a difference between a first pixel value of the first frame and a respective pixel value of a number of frames contiguous to the first frame for a predetermined time being equal to or less than a predetermined value, stopping generating new screen data regarding timing control and frame rate control of the number of frames contiguous to the first frame for controlling a display; and displaying the first frame based on the first screen data on the display.

10. The method of claim 9, further comprising:

displaying the first frame based on the first screen data based on identifying that a second frame having a second pixel value different from the first pixel value by a first value or more is not received for a duration greater than predetermined time.

11. The method of claim 10, further comprising:

reducing a value of a backlight unit (BLU) of the display to a predetermined level or less based on displaying the first frame based on the first screen data.

12. The method of claim 11, further comprising:

deactivating the BLU based on identifying that the second frame is not received for a second time or more.

13. The method of claim 12, further comprising:

generating second screen data regarding timing control and frame rate control of the second frame, based on receiving the second frame; and displaying the second frame on the display based on the second screen data.

14. The method of claim 13, further comprising:

identifying histogram information of the first frame; and identifying the first pixel value based on the histogram information.

15. The method of claim 14, wherein the pixel value is a red-green-blue (RGB) value.

16. The method of claim 15, further comprising:

resuming generation of the screen data for controlling the display based on receiving the second frame.

17. A method for operating an electronic device, the method comprising:

receiving an input signal from an external device;

monitoring histogram information of the input signal;

identifying that there is no change in the input signal for a predetermined time based on the histogram information while a first frame is displayed;

stopping timing and frame rate control for the input signal based on identifying that there is no change in the input signal for the predetermined time;

displaying the first frame based on it being identified that there is no change in the input signal, without displaying at least one frame after the first frame; and resuming the timing and the frame rate control for the input signal based on identifying a change in the input signal.

18. The method of claim 17, further comprising:

determining that there is no change in the input signal based on the change in a pixel value of a frame constituting video data in the input signal being equal to or less than a predetermined value or less.

19. The method of claim 18, further comprising:

reducing a backlight unit (BLU) value to a predetermined level or less based on identifying that there is no change in the input signal for the predetermined time.

20. The method of claim 19, further comprising:

setting the BLU value to the predetermined value or more based on identifying the change in the input signal.

* * * * *